(12) United States Patent
Pedersen

(10) Patent No.: US 12,006,153 B2
(45) Date of Patent: Jun. 11, 2024

(54) CONVEYOR SYSTEM

(71) Applicant: MAREL A/S, Aarhus N (DK)

(72) Inventor: Bjorn Heide Pedersen, Aarhus N (DK)

(73) Assignee: MAREL A/S, Arhus N (DK)

( * ) Notice: Subject to any disclaimer, the term of this patent is extended or adjusted under 35 U.S.C. 154(b) by 0 days.

(21) Appl. No.: 18/547,749

(22) PCT Filed: Mar. 7, 2022

(86) PCT No.: PCT/EP2022/055671
§ 371 (c)(1),
(2) Date: Aug. 24, 2023

(87) PCT Pub. No.: WO2022/189323
PCT Pub. Date: Sep. 15, 2022

(65) Prior Publication Data
US 2024/0083679 A1    Mar. 14, 2024

(30) Foreign Application Priority Data

Mar. 8, 2021   (EP) .................................. 21161254

(51) Int. Cl.
*B65G 15/62*   (2006.01)
*B25J 9/00*    (2006.01)

(52) U.S. Cl.
CPC ............ *B65G 15/62* (2013.01); *B25J 9/0093* (2013.01); *B65G 2201/0202* (2013.01); *B65G 2203/0233* (2013.01)

(58) Field of Classification Search
None
See application file for complete search history.

(56) References Cited

U.S. PATENT DOCUMENTS

| 3,310,161 | A   |   | 3/1967  | Kraft, Jr. |            |
|-----------|-----|---|---------|------------|------------|
| 4,159,760 | A   | * | 7/1979  | Kovacs     | B65G 23/26 |
|           |     |   |         |            | 53/493     |
| 7,628,267 | B2  | * | 12/2009 | Trieb      | B65G 47/945|
|           |     |   |         |            | 198/845    |
| 11,498,768| B2  | * | 11/2022 | de Wet     | B65G 21/10 |

FOREIGN PATENT DOCUMENTS

| DE | 715012 C         | 12/1941 |           |
|----|------------------|---------|-----------|
| EP | 3219645 A1       | 9/2017  |           |
| WO | 2005106405 A1    | 11/2005 |           |
| WO | WO-2005106405 A1 *| 11/2005 | G01G 19/387 |
| WO | 2012055411 A1    | 5/2012  |           |

OTHER PUBLICATIONS

Extended European Search Report from corresponding European Patent Application No. EP21161254.4, Aug. 2, 2021.
International Search Report from corresponding PCT Application No. PCT/EP2022/055671, Jun. 22, 2022.

* cited by examiner

*Primary Examiner* — Kavel Singh
(74) *Attorney, Agent, or Firm* — Workman Nydegger

(57) ABSTRACT

A conveyor system includes an endless belt conveyor with an endless belt and one or more curve guide elements arranged for guiding at least a part of a stretch of the upper run of the endless conveyor belt to extend laterally from one side of the support structure and the lower run of the endless conveyor belt.

19 Claims, 4 Drawing Sheets

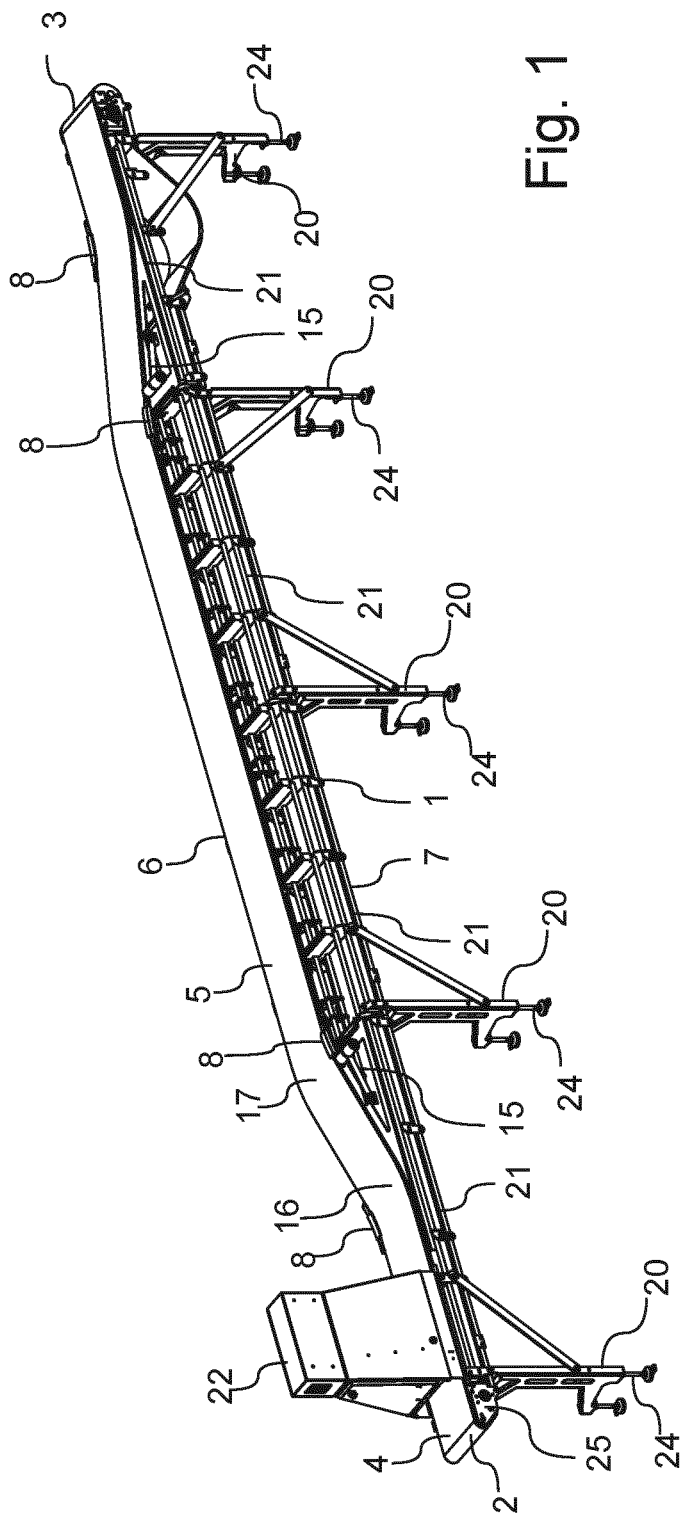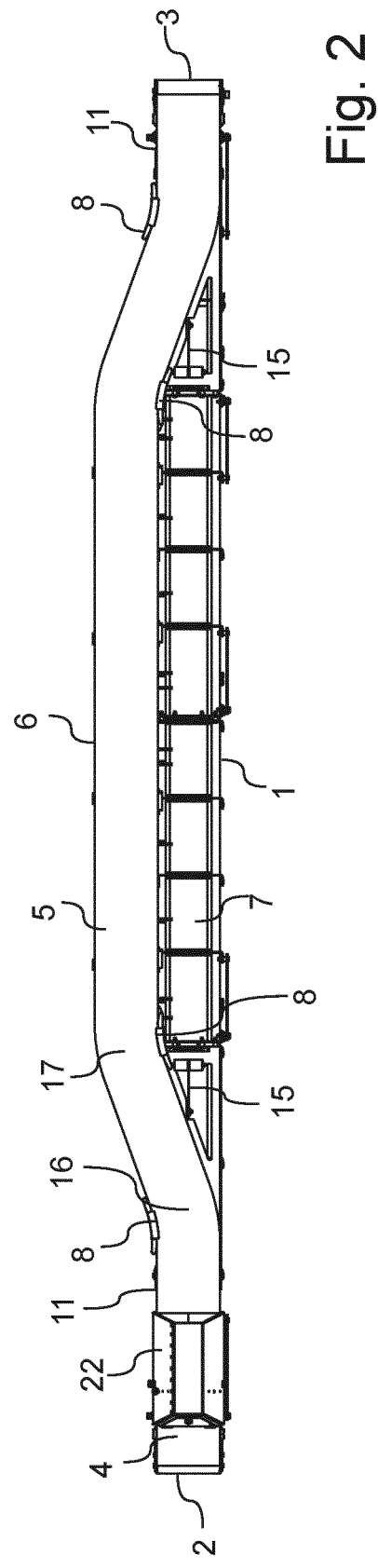

CONVEYOR SYSTEM

FIELD OF THE INVENTION

The present invention relates to conveyors and especially to a conveyor system and to a method of conveying items by a conveyor system, the conveyor system comprising an endless belt conveyor with a support structure forming two opposite ends and an endless conveyor belt having a conveying surface and where the endless conveyor belt extend between an infeed end and an opposite end so as to form an upper run and a lower run with the conveying surface facing up at the upper run and down at the lower run.

BACKGROUND

Conveyor systems of similar type are used in the prior art for many different applications and especially in the food processing industry. Such conveyors are used for efficient conveying of multiple separate food products e.g. for packing, sorting, portioning, batching and weighing the food products such as pieces of fresh fish or meat.

One example of such a conveyor system is disclosed in WO2012/055411 showing a conveyor system for carrying and/or conveying batching means such as trays or the like. This prior art conveyor system comprises at least one batch conveyor for carrying and/or conveying said batching means, while objects such as food objects are being transferred from a supply of said objects to said batching means by means of at least one robotic handling means. In this prior art document it is suggested that the at least one batch conveyor is configured for being adjustable in an essentially vertical direction in relation to said at least one robotic handling means.

Another conveyor system is known from WO2005/106405 disclosing a system for packaging of food products of varying sizes, in which at least two food products are to be packaged in the same packing. This prior art system comprises an object conveyor, a conveyor for portion carriers, a collecting means and a moving means. In use, the system makes an estimate of the quantity of each food product, registers the location of each food product on the object conveyor, moves each food product to a collection area, determines by way of a computer program whether a food product is to be moved to a portion carrier and, if such move is determined, also determines to which portion carrier the food product is to be moved. The system raises the food product to be moved to a portion carrier and moves the food product to the selected portion carrier and releases the food product to the portion carrier.

DESCRIPTION OF THE INVENTION

On this background it is an object of the present invention to provide a conveyor system with the option of even more efficient and safe handling of the conveyed items and especially when picking and transferring the items conveyed on an endless belt conveyor away from it.

According to the invention this is obtained by providing a conveyor system comprising an endless belt conveyor with a support structure forming an infeed end and an opposite end and where an endless conveyor belt having a conveying surface extends between the infeed end and the opposite end so as to form an upper run and a lower run with the conveying surface facing up at the upper run and down at the lower run, and where one or more curve guide elements are arranged for guiding at least a part of a stretch of the upper run of the endless conveyor belt to extend laterally from one side of the support structure and the lower run of the endless conveyor belt.

The conveyor system according to the invention thereby provides more options for mutually positioning the conveyor and especially the conveyor belt relative to e.g. other handling and/or transporting equipment in a complete system, and so that the efficiency of such other handling and/or transporting equipment is increased as the stretch of the conveyor belt can be positioned above a part of the other handling and/or transporting equipment as described elsewhere herein.

One or more of the curve guide elements are preferably formed by one or more posts each pressing against one side of the endless belt so that the belt is deflected laterally to provide a clockwise or anticlockwise turn. In this relation the guide elements can also have means for keeping the belt flat against the support structure and/or a cantilever construction, even when it is forced through the turns, in particular where it is most deflected.

The curve guide elements provide that the endless belt can reach a significant distance out on the one side of the support structure, for example by a lateral extent of 30-50% or more with respect to the width of the endless belt.

In this relation, the laterally extending conveyor belt may advantageously be supported in different ways but in a preferred embodiment the part of the stretch of the upper run is supported by a cantilever construction attached at said one side of the support structure so that the endless conveyor belt can be moved and positioned as a single integral unit. The cantilever construction preferably carries the stretch of the upper run in a hanging position such that no support is present underneath this cantilever construction. Hereby the cantilever structure carrying the stretch of the upper run may be positioned over a part of another equipment.

The cantilever construction furthermore provides the advantage that the total height of the cantilever construction, with the upper run of the endless belt resting upon it, can be minimized, in particular so as to leave free space between a lower side of the cantilever construction and a floor on which the support structure is standing. This provides even more options for mutually positioning the endless conveyor with respect to other handling and/or transporting equipment.

In order to provide efficient support for the endless conveyor belt the cantilever construction may advantageously comprise one or more cantilever plate elements extending horizontally from the one side of the support structure.

In this relation the cantilever construction may further comprise a number of cantilever elements being attached to the support structure at the one side and being arranged for carrying the cantilever plate elements.

In a preferred embodiment at least a part of the cantilever construction is removably, preferably even without the use of tools attached to the support structure. This provides easy access for cleaning the separate parts of the cantilever construction.

In this relation at least a part of the cantilever construction may advantageously be attached to the support structure via one or more hinges allowing the cantilever construction to be rotated upwardly at least to a substantially upright stable position or further to a position where it is turned upside down.

In a further preferred embodiment, the lower run of the endless conveyor belt between the infeed end and the opposite end of the support structure is straight in the horizontal direction.

According to a preferred embodiment of the invention providing even more easy access for cleaning the support structure further comprises at least one lifting jack arranged near the one or more curve guide elements and being adapted for lifting the endless conveyor belt free of the curve guide elements.

The curve guide elements are advantageously arranged so that both the infeed end and said stretch of the upper run of the endless conveyor belt are straight in the horizontal direction and separated by a clockwise or anticlockwise curve. This is especially advantageous when conveying soft food items such as meat or fish on the endless conveyor belt as such soft food items that are transferred to the endless conveyor belt at the infeed end will rest in the same position when they are at the straight part of the endless conveyor belt.

In this relation the curve guide elements may further advantageously be arranged so that the infeed end and said stretch of the upper run of the endless conveyor belt are mutually parallel and separated by both a clockwise and an anticlockwise turn. Thereby the risk of having items changing position or orientation on the endless conveyor belt is significantly reduced.

In a further preferred embodiment, the conveyor system comprises an item detection system adapted for determining at least the position of each item resting on the endless conveyor belt and, and for transferring data regarding the position of each item resting on the endless conveyor belt to a control unit. The control unit may be a control unit configured to control an automatic picking unit, e.g. as described below. Alternatively, the control unit may be a different control unit, e.g. for controlling a different process or machine.

The conveyor system according to the invention is especially advantageous when further comprising at least one automatic picking unit, such as a robot or a pick-and-place unit, and when said stretch of the endless conveyor belt extend through the working space of the at least one automatic picking unit. A control unit can be employed for controlling the automatic picking unit to pick up at least some of the items from the endless conveyor belt when they pass during operation of the conveyor system. The conveyor system may include a single automatic picking unit or more than one of such units. When the conveyor system according to the invention is used with the stretch of the upper run positioned above another handling and/or transporting equipment, this may make it easier to handle products transported by the conveyor belt. When the handling and/or transporting equipment comprises a robot and the stretch of the upper run is positioned above a side table or frame of the equipment and within the working space of the robot, this robot obtains more conveyor belt area within its working area and hereby the products transported on the conveyor belt are longer within this working area giving the robot longer time to work with the products.

In a preferred embodiment comprising both a picking unit and an item detection system the control unit can advantageously be employed for controlling the automatic picking unit to pick up at least some of the items from the endless conveyor belt when they pass during operation of the conveyor system, based upon input from the item detection system.

In this relation the item detection system is preferably arranged upstream from the automatic picking unit. In particular, in some embodiments, the automatic picking unit is arranged above the infeed end of the endless conveyor belt or above a straight section of the endless conveyor belt in a position upstream from the one or more automatic picking units.

In an especially advantageous embodiment of the invention the conveyor system further comprises another item handling or processing machine having one or more positions for placing an item. Said another item handling or processing machine may have a side table or other machine component or frame arranged between the support structure of the endless belt conveyor and said position for placing an item and said stretch of the upper run may extend at least partly over said other machine component, side table and/or frame. Examples of such other handling or processing machines include a packaging conveyor, such as a deep draw packaging machine, adapted for conveying a film or multiple trays and having a side table arranged between the support structure of the endless belt conveyor and the film or trays for receiving products, and where said stretch of the upper run extends at least partly over said side table.

The present invention also relates to a method of conveying items by a conveyor system, in particular by a conveyor system as mentioned above, the conveyor system at least comprising an endless belt conveyor with a support structure forming two opposite ends and an endless conveyor belt having a conveying surface and where the endless conveyor belt extend between an infeed end and an opposite end so as to form an upper run and a lower run with the conveying surface facing up at the upper run and down at the lower run. In this relation the invention provides that the items are conveyed by at least a part of a stretch of said upper run of the of the endless conveyor belt in a direction lateral to the support structure and the lower run of the endless conveyor belt, and thereby it is possible to easily, efficiently and safely convey items, such as food items very close to neighboring food processing equipment.

In this relation the conveyor system further preferably also comprises at least one automatic picking unit, such as a robot or pick-and-place unit, and that said stretch of the endless conveyor belt extends through the working space of the at least one automatic picking unit, and wherein the automatic picking unit picks items from said stretch of the endless conveyor belt.

The method according to the invention is especially advantageous for conveying food items such as fish, meat, processed food and/or the like.

BRIEF DESCRIPTION OF THE DRAWING

FIG. 1: Is a perspective view of one embodiment of a conveyor system according to the invention.

FIG. 2: Is a top view of the conveyor system shown in FIG. 1.

DETAILED DESCRIPTION OF AN EMBODIMENT OF THE INVENTION

Figure 3:
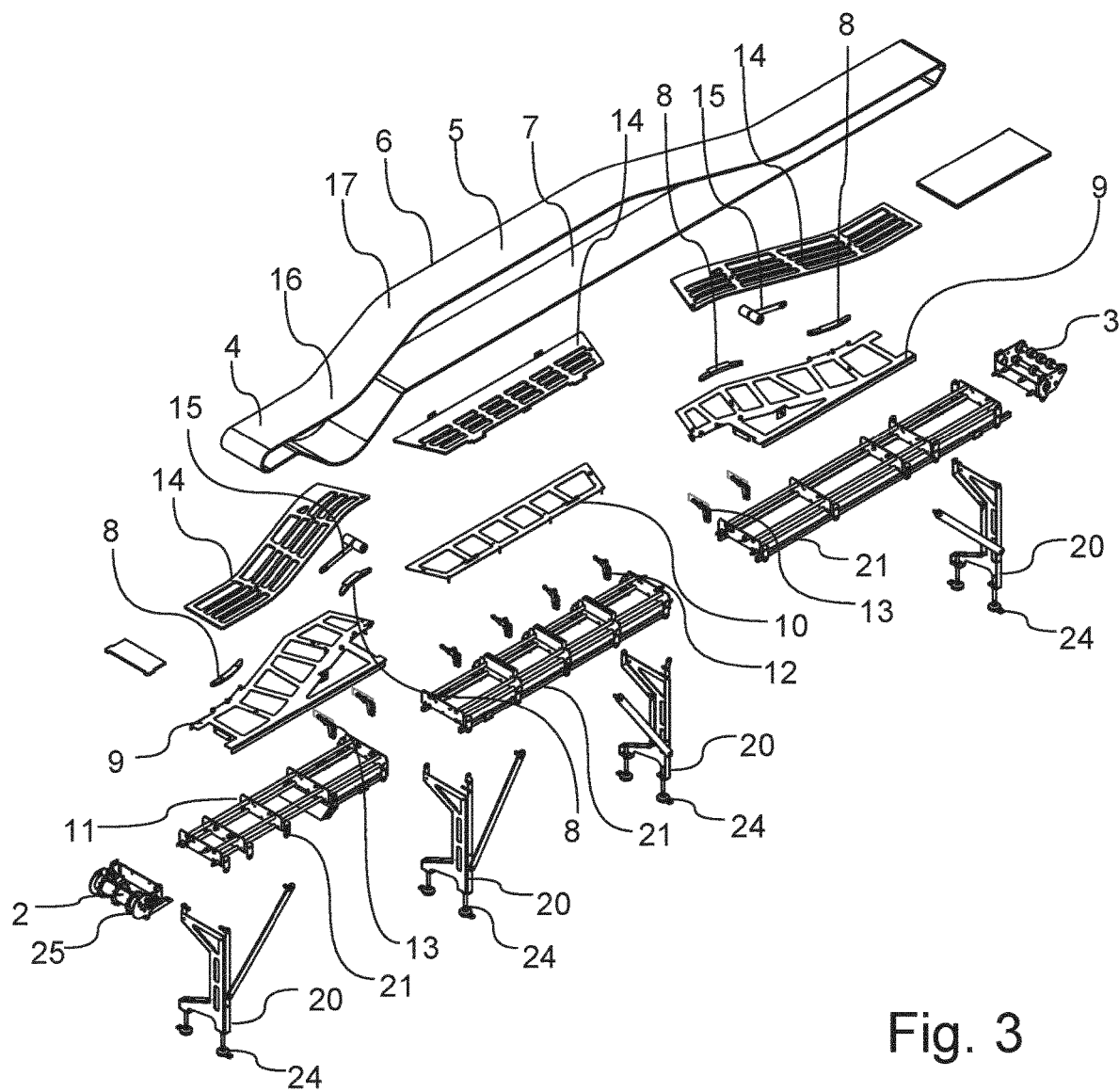
FIG. 3: Is an exploded drawing showing a second embodiment of a conveyor system according to the invention.

FIGS. 1 and 2 show an example of a conveyor system according to one embodiment of the invention. This embodiment is a single endless belt conveyor with a support structure 1 with an infeed end 2 and an opposite end 3. An endless belt 4 extends between the infeed end 2 and the opposite end 3 and has a conveying surface 5 facing upwards at the upper run 6 of the endless belt 4 and down at the lower run 7 of the endless belt 4.

According to this embodiment of the invention, the endless belt 4 of the endless belt conveyor is adapted such that items arranged at the endless belt 4 at the infeed end 2 is first conveyed along a straight line and thereafter through a first turn 16 and preferably a second opposite turn 17 where after it is again conveyed along a straight line. This provides that the items arranged on the conveying surface 5 are conveyed by at least a part of a stretch of said upper run 6 of the endless conveyor belt 4 in a direction lateral to the support structure 1 and the lower run 7 of the endless conveyor belt 4.

The turns 16, 17 on the upper run 6 of the endless conveyor belt 4 are provided by curve guide elements 8 that close to the infeed end 2 lead a part of the upper run 6 of the endless conveyor belt 4 in a lateral direction with respect to the lower run 7 of the endless conveyor belt 4. Thereby a stretch of the upper run 6 of the endless conveyor belt 4 is forced by the curve guide elements 8 to extend laterally from one side 11 of the support structure 1 and the lower run 7 of the endless conveyor belt 4. Curve guide elements 8 close to the opposite end 3 lead a part of the upper run 6 of the endless conveyor belt 4 back onto the support structure 1.

In this relation it will be apparent to the skilled person that such curve guide elements 8 may be embodied in many ways and especially that they must be suitable for providing the above mentioned turns 16, 17 on the endless conveyor belt 4. In this embodiment the endless conveyor belt 4 is a modular belt allowing that each of the turns 16, 17 can be provided by one curve guide element 8 arranged at one side, namely the inside, of each turn 16, 17.

Figure 6:
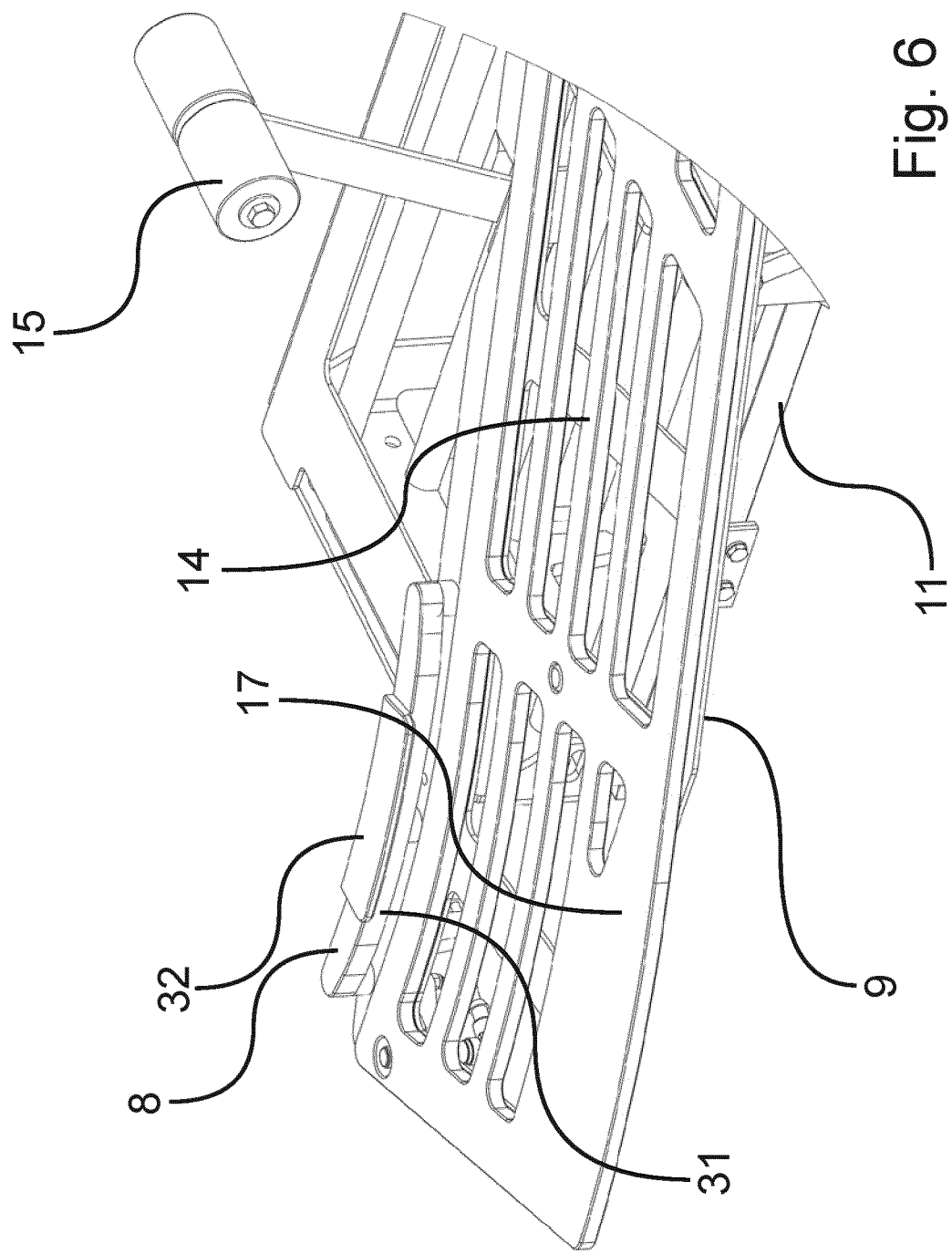
FIG. 6: Is a perspective detailed view of a part of the conveyor system shown in the preceding figures.

One guide element 8 is shown in more detail on FIG. 6 where a part comprising the turn 17 shown in FIGS. 1, 2 and 3 of the endless conveyor is shown without the endless conveyor belt attached to it. The guide element, here guide element 8, comprises a post with a lateral slide surface 31 that presses against one side of the endless conveyor belt 4 and has an upper flange 32 arranged for ensuring that the endless conveyor belt 4 is kept in position even under the force of the guide element 8 acting against the side of the endless conveyor belt 4. FIG. 6 also shows one lifting jack 15 in an upright position in order to provide that the endless conveyor belt (not shown) can be placed so that it is free of the guide elements 8. The lifting jack 15 can be rotated to its lower position as shown in FIGS. 1, 2 and 3.

FIG. 3 shows a second embodiment of the invention in an exploded view. In this embodiment the endless belt conveyor is an assembly of separate modular components, where the support structure 1 comprises a number of support legs 20 that each carries a number of support frames 21 and one or more drive units 25.

The support structure 1 has one side 11 from which a stretch of the upper run 6 of the endless conveyor belt 4 is supported by a cantilever construction.

The cantilever construction comprises cantilever plate elements 9, 10 extending substantially horizontally from the one side 11 of the support structure 1. The cantilever plate elements 9, 10 each extend horizontally from the one side 11 of the support structure 1 and each carry a cantilever table element 14. Each cantilever table element is removably attached to one cantilever plate element 9, 10 for cleaning. The cantilever plate elements 9, 10 are attached to the support structure 1 via cantilever elements in the form of brackets 13 and bracket hinges 12 and the bracket hinges 12 allow the cantilever plate element 10 to be rotated upwardly at least to an upright position or even to be turned upside down for cleaning purposes.

According to a preferred embodiment the cantilever plate elements 9, 10 are made from a stainless material such as stainless steel and the cantilever table elements 14 are made from a plastic material providing low friction with the endless conveyor belt.

Figure 4:
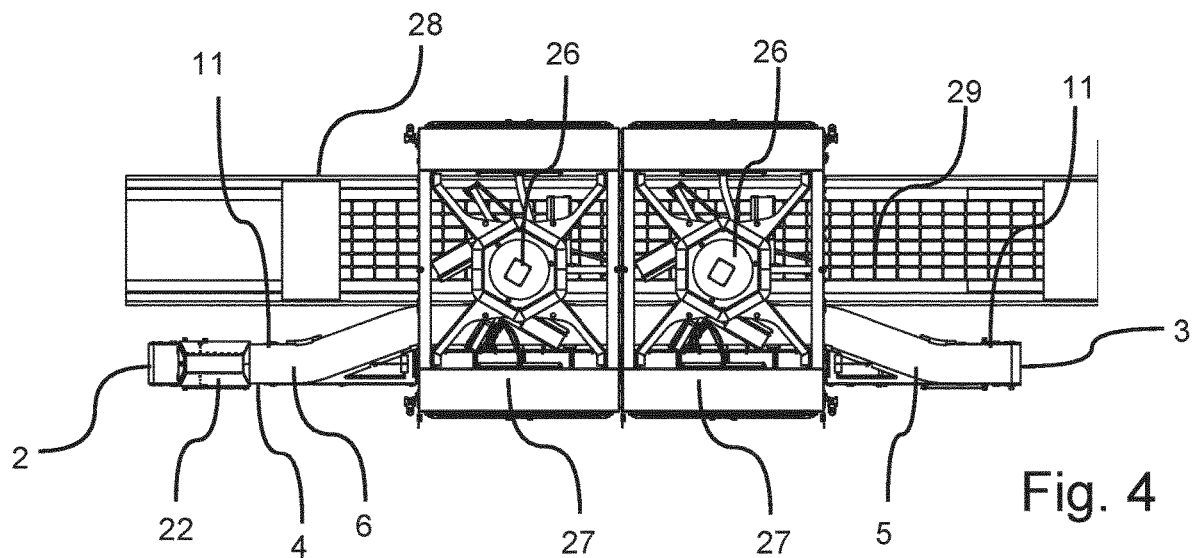
FIG. 4: Is a top view of a third embodiment of a conveyor system according to the invention.

As shown in FIG. 3 the complete structure of the endless belt conveyor provides the option of assembling endless belt conveyors with different lengths. The conveyor built with the components shown in FIG. 3 may thereby only have room for conveying items to a single handling robot but it is possible, by using more of the same components shown in FIG. 3 to build a longer endless belt conveyor such as the one shown in FIGS. 1 and 2 that can be used for conveying items to e.g. two separate handling robots 26 as shown in FIG. 4.

As described below, especially with respect to FIGS. 4 and 5, the conveyor system according to the invention may include other conveying or handling units, such as handling robots and packaging machines or conveyors. Such other handling equipment is not shown in FIGS. 1, 2 and 3 but the skilled person will, based upon the teaching of the present invention, be aware that the conveyor shown in these figures can be combined with any other handling or conveying equipment.

In this relation it is especially advantageous to have a vision or detection system adapted for detecting or otherwise determining at least the position of the items on infeed end 2 of the endless conveyor belt 4 upstream from any such items handling or conveying equipment.

An example of such a vision or detection system 22 being arranged above the endless belt conveyor is shown in FIGS. 1 and 2, and it will be evident to the skilled person that such a vision or detection system 22 can be relatively simple for the purpose of just detecting the position of the items on the endless conveyor belt 4, but it may alternatively be very complex and adapted for also detecting e.g. the orientation, shape, size, type, quality, material, temperature or even the weight of the items on the endless conveyor belt 4.

Furthermore, it is evident to the skilled person to provide a suitable control system being adapted, based upon signals received from the vision or detection system 22, to control any other item handling or conveying equipment arranged downstream from the vision or detection system 22.

FIG. 4 shows an embodiment of the invention where the conveyor system comprises an endless belt conveyor as shown in FIGS. 1 and 2 in combination with two handling robots 26 each being supported by an overhead frame 27 so that they are arranged above the upper run 6 of the endless conveyor belt 4 on the endless belt conveyor.

In this embodiment the handling robots are delta type robots, but it will be apparent to the skilled person that other types of robots or any other handling equipment, such as pick and place units may alternatively be used.

Alongside the endless belt conveyor a deep draw packaging machine 28 is arranged being adapted for providing and conveying a film or multiple trays 29 below the handling robots 26. This allows that the handling robots 26, based upon control signals received from a suitable control unit, efficiently can pick items from the upper run 6 of the endless conveyor belt and being detected by the vision or detection system 22 as mentioned above, and the handling robots 26 can place each item in a selected tray 29 on the deep draw packaging machine 26. The trays may be in the form of depressions in a foil, or they may be formed as another type of receptacle.

Figure 5:
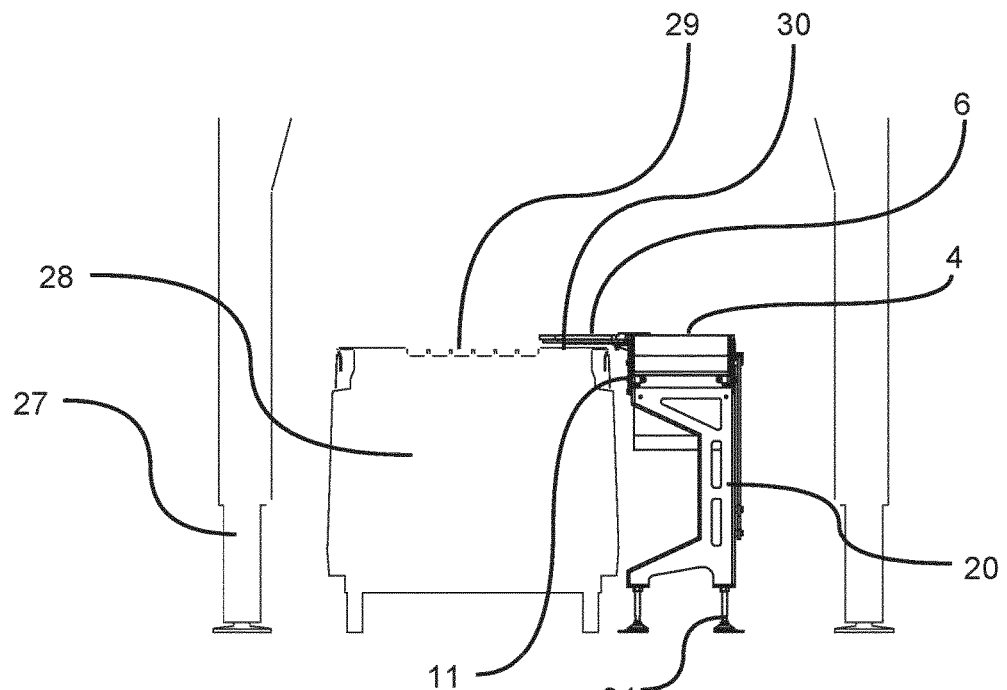
FIG. 5: Is a principal drawing showing the outline of an embodiment of a conveyor system according to the invention seen from the infeed end.

In this relation FIG. 5 shows an end view of an embodiment of a conveyor system according to the invention and comprising an endless belt conveyor arranged alongside a deep draw packaging machine 28 as shown in FIG. 4. According to the invention, and due to the fact that the upper run 6 of the endless conveyor belt 4 extends laterally from one side 11 of the support structure 1 of the endless belt conveyor, it is possible to arrange the endless belt conveyor so that a stretch of the upper run 6 of the endless conveyor belt 4 reaches in over the side table 30 and/or frame of the deep draw packaging machine 28.

The trays 29 of the deep draw packaging machine 28 and the stretch of the upper run 6 of the endless conveyor belt 4 extending over the side table 30 of the deep draw packaging machine, are thereby very close, and this reduces the distance by which the handling robots (not shown) arranged in the overhead frame 27 need to carry each item picked between the endless conveyor belt 4 and the selected tray. Moreover, a large portion of the upper run 6 of the endless conveyor belt can be arranged so as to pass through the operating range of the handling robot(s). Furthermore, the support structure 1 of the endless belt conveyor is adjustable in the vertical direction due to the height adjustable feet 24. This allows that the height difference between the stretch of the upper run 6 of the endless conveyor belt 4 and the side table 30 and/or frame of the deep draw packaging machine can be minimized so that it further reduces the distance that the handling robot have to move each item.

The invention claimed is:

1. A conveyor system comprising an endless conveyor belt with a support structure forming an infeed end and an opposite end and where an endless conveyor belt having a conveying surface extends between the infeed end and the opposite end so as to form an upper run and a lower run with the conveying surface facing up at the upper run and down at the lower run,
   wherein one or more curve guide elements are arranged for guiding at least a part of a stretch of the upper run of the endless conveyor belt to extend laterally from one side of the support structure and the lower run of the endless conveyor belt, wherein the endless conveyor belt is deflected in a direction lateral relative to a direction extending between the infeed end and the opposite end, and also to the support structure and the lower run by the one or more curve guide elements to provide a clockwise or anticlockwise turn along the upper run.

2. The conveyor system according to claim 1, wherein the part of the stretch of the upper run is supported by a cantilever construction extending substantially horizontally from said one side of the support structure.

3. The conveyor system according to claim 2, wherein the cantilever construction comprises one or more cantilever plate elements extending horizontally from the one side of the support structure.

4. The conveyor system according to claim 3, wherein the cantilever construction further comprises cantilever elements being attached to the support structure at the one side and being arranged for carrying the cantilever plate elements.

5. The conveyor system according to claim 3, wherein at least a part of the cantilever construction is removably attached to the support structure.

6. The conveyor system according to claim 5, wherein at least a part of the cantilever construction is attached to the support structure via one or more hinges allowing that said part of the cantilever construction to be rotated upwardly.

7. The conveyor system according to claim 1, wherein the lower run of the endless conveyor belt between the infeed end and the opposite end of the support structure is straight in a horizontal direction.

8. The conveyor system according to claim 1, wherein the support structure further comprises at least one lifting jack arranged near the one or more curve guide elements and being adapted for lifting the endless conveyor belt free of the curve guide elements.

9. The conveyor system according to claim 1, wherein the curve guide elements are arranged so that both the infeed end and said stretch of the upper run of the endless conveyor belt are straight in the horizontal direction and separated by a clockwise turn and/or an anti-clockwise turn.

10. The conveyor system according to claim 1, wherein it further comprises an item detection system being adapted for determining at least a position of each item resting on the endless conveyor belt, and for transferring data regarding the position of each item resting on the endless conveyor belt to a control unit.

11. The conveyor system according to claim 1, wherein it further comprises at least one automatic picking unit, such as a robot or pick-and-place unit, and that said stretch of the endless conveyor belt extends through a working space of the at least one automatic picking unit, and that a control unit is adapted for controlling the automatic picking unit to pick up at least some items from the endless conveyor belt when they pass during operation of the conveyor system.

12. The conveyor system according to claim 1, wherein it further comprises another item handling or processing machine having one or more positions for placing an item, such as a deep draw packaging machine adapted for conveying multiple trays, and where said another item handling or processing machine have a side table or other machine component arranged between the support structure of the endless belt conveyor and said position or trays for placing an item, and where said stretch of the upper run extends at least partly over said side table or other machine component.

13. The conveyor system according to claim 1, wherein the direction lateral of the upper run to the support structure has a lateral extent of 30-50% with respect to a width of the endless conveyor belt.

14. The conveyor system according to claim 1, wherein the one or more curve guides presses against a side of the upper run of the endless conveyor belt to deflect the belt laterally.

15. A method of conveying items by a conveyor system comprising an endless belt conveyor with a support structure forming an infeed end and an opposite end and an endless conveyor belt having a conveying surface that extends between the infeed end and the opposite end so as to form an upper run and a lower run with the conveying surface facing up at the upper run and down at the lower run,
   conveying items by a first stretch of said upper run of the endless conveyor belt; and
   guiding at least part of a stretch of the upper run of the endless conveyor belt in a direction lateral relative to a direction extending between the infeed end and the opposite end, and also to the support structure and the lower run by one or more curve guide elements to provide a clockwise or anticlockwise turn along the upper run.

16. The method according to claim 15, wherein the conveyor system further comprises at least one automatic picking unit, such as a robot or pick-and-place unit, and that said stretch of the endless conveyor belt extends through a working space of the at least one automatic picking unit, and wherein the automatic picking unit picks items from said stretch of the endless conveyor belt.

17. The method according to claim 15, wherein the items conveyed on the endless belt are food items.

18. The conveyor system according to claim 15, wherein the one or more curve guides presses against a side of the endless conveyor belt to deflect the belt laterally.

19. A conveyor system comprising an endless conveyor belt with a support structure forming an infeed end and an opposite end and where an endless conveyor belt having a conveying surface extends between the infeed end and the opposite end so as to form an upper run and a lower run with the conveying surface facing up at the upper run and down at the lower run;
   wherein one or more curve guide elements are arranged for guiding at least a part of a stretch of the upper run of the endless conveyor belt to extend laterally from one side of the support structure and the lower run of the endless conveyor belt;
   wherein the part of the stretch of the upper run is supported by a cantilever construction extending substantially horizontally from said one side of the support structure;
   wherein the cantilever construction comprises one or more cantilever plate elements extending horizontally from the one side of the support structure;
   wherein at least a part of the cantilever construction is removably attached to the support structure;
   wherein at least a part of the cantilever construction is attached to the support structure via one or more hinges allowing that said part of the cantilever construction to be rotated upwardly.

* * * * *